United States

[11] 3,632,189

[72] Inventor Harvey L. Ratliff, Jr.
Waldorf, Md.
[21] Appl. No. 31,811
[22] Filed Apr. 9, 1970
[45] Patented Jan. 4, 1972
[73] Assignee Jetru Inc.
Amarillo, Tex.
Continuation of application Ser. No. 662,716, Aug. 23, 1967, now abandoned. This application Apr. 9, 1970, Ser. No. 31,811

[54] WIDE-ANGLE LENS
8 Claims, 9 Drawing Figs.
[52] U.S. Cl. ................................................. 350/189
[51] Int. Cl. ................................................. G02b 3/04
[50] Field of Search ..................................... 350/189; 351/168, 169, 196

[56] References Cited
UNITED STATES PATENTS
943,449  12/1909  Obford .......................... 351/169
1,143,316  6/1915  Poullain ........................ 351/169

Primary Examiner—David Schonberg
Assistant Examiner—Michael J. Tokar
Attorney—Harvey L. Ratcliff, Jr.

ABSTRACT: A complex aspheric surface for a wide-angle lens is devised which enables distortionless wide-angle viewing through the lens of fisheye-type pictures with ideal accommodation characteristics from several principles the most important of which are: that the angle between a ray from a point on the object plane of the lens entering the eye of an observer looking into the lens and the optical axis of the lens has a substantially constant relation with the distance along the object from this point to the optical axis of the lens, the principles of the lensmaker's equation, general lens theory and physical principles, trigonometry and general mathematical procedures.

INVENTOR
Harry L. Ratliff

FIG. 6
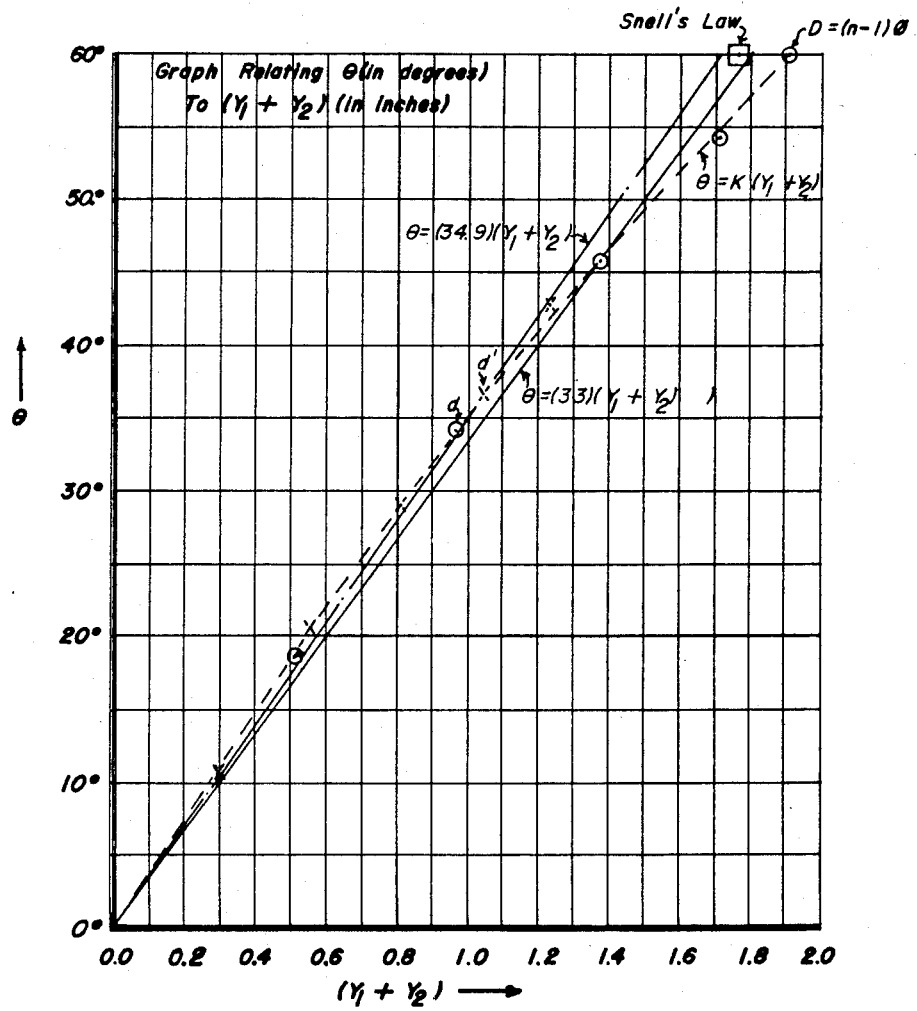
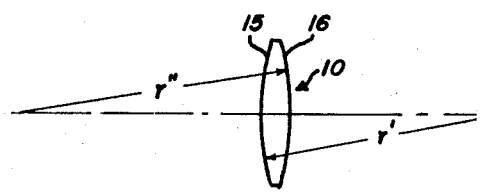
FIG. 7a
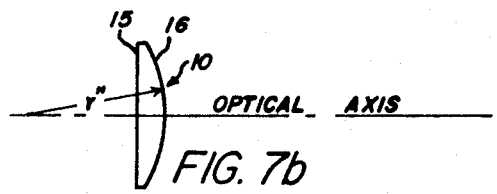
FIG. 7b
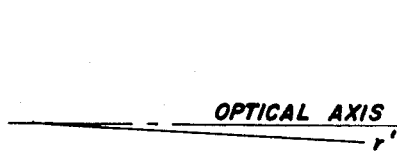
FIG. 7c
INVENTOR
Harvey L. Ratliff Jr.

WIDE-ANGLE LENS

This is a continuation of application Ser. No. 662,716 filed Aug. 23, 1967, now abandoned.

OBJECTS ADVANTAGES AND SUMMARY

The present invention relates generally to wide-angle lenses and more particularly to a wide-angle lens capable of being used as an ocular which will substantially nullify fisheye-type distortion and which will reconstruct a virtual image surface of an object plane which has all its virtual image points substantially the same distance from a point upon the optical axis of the lens.

There are many "fallout" type benefits of the present lens. One of them is that this lens can be used to view a fisheye-type picture and will virtually eliminate the fisheye-type "barrel" distortion. Another of these benefits is that it virtually eliminates the problems of accommodation for wide-angle stereoscopes.

The term "fisheye-type distortion" as herein used means the type of distortion produced by the original "Hill fisheye" or one of the more recent fisheye lenses such as the "Nikon fisheye" or the "Kenko fisheye conversion."

The most contemplated purpose of the lens is its use in a wide-angle stereoscope to make possible the use of only one lens element in each ocular without causing accommodation problems when the angle of view is between 90° and 180° and the use in conjunction with a fisheye-type stereo pair of pictures to recreate a virtually distortionless wide-angle stereoscopic scene. However, the lens is, of course, not limited to this particular use.

The art is, of course, replete with teachings of aspherical lenses, but it is devoid of a teaching of a lens which will assuredly accomplish the most contemplated purpose of the present lens nearly as well as the present invention.

Other objects and advantages of my invention will become more apparent from a study of the following description taken with the accompanying drawings wherein.

Figure 2:
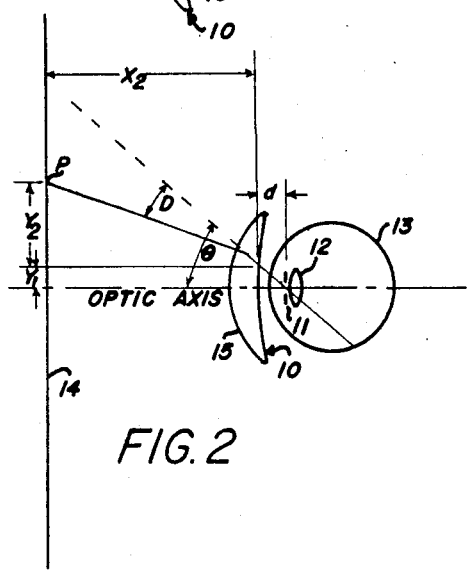
Figure 3:
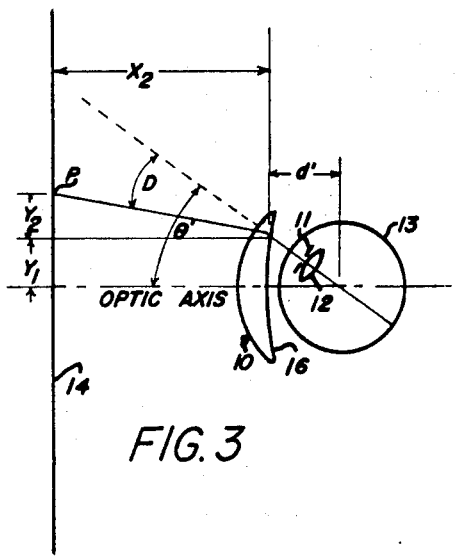

FIG. 6 is a graph relating $\theta$ (in degrees) to $(Y_1+Y_2)$ (in inches) where $(Y_1+Y_2)$ is the distance along the object plane from the optical axis of the lens to a point of origin upon the object plane of a ray and $\theta$ is the angle said ray from said origin point makes with said optical axis when it enters the eye pupil of an observer looking into the lens, as illustrated in FIGS. 2 and 3.

FIG. 7 is a diagrammatic drawing illustrating the five different forms the lens can take without departing from the spirit and scope of the present invention.

For a more detailed description of the present invention, reference is first made to FIGS. 1-4.

It is first desirable to determine K, the relation between $\theta$ of FIG. 2 (or $\theta'$ of FIG. 3) and $Y_1+Y_2$ (see FIGS. 2 and 3), but the exact value of K depends upon the variable radius $r''$ and is therefore, highly difficult to compute. However, applicant has found that K may be assumed constant, with only minor error, for computational purposes.

The specific arbitrary lens for the specific example is chosen to have its aspherical surface concave, to be a positive meniscus lens, with a 1-inch diameter, with: $r'=0.677$ inch, $X_2=1.525$ (when $Y_1=0.5$), $d=0.288$ inch (when $Y_1=0.5$ inch), where: $r'$ is the radius of the nonaspheric surface (which is spherical unless $r'=\infty$), $X_2$ is the distance from the point P upon the aspheric surface 16 to the object plane when measured parallel to the optical axis of the lens 10, $d$ is the distance from this said point upon the aspherical surface 16 to the pupil 11 of eye 13 as measured parallel to the optical axis of the lens 10, and with the angle $\alpha$ being the angle between $r''$ and the optical axis of 10 at the said (or any particular point upon) upon 16 which is $Y_1$ from said optical axis, the angle B being the angle between $r'$ and the optical axis of 10 when at a particular point upon surface 15 which is $Y_1$ from the optical axis of 10, the angle $\phi$ being the angle between an incremental surface portion of surface 16 and an incremental surface portion of surface 15 when they are both $Y_1$ from the optical axis of 10, $Y_1$ being the distance from the particular point on 15 or 16 to the optical axis of 10, D being the angle of deviation a ray undergoes as it passes through lens 10 at a particular point $Y_1$ from the optical axis of 10, the distance 0 being from the point of origin upon the object plane 14 to this point $Y_1$ from said optical axis of the ray passing through this point of the lens $Y_1$ from the optical axis of the lens and through the pupil 11 of eye 13, the thickness of the lens being ignored—with minor error—for simplicity, and the distance $(Y_1+Y_2)$ being from said point of origin upon plane 14 to the optical axis as measured along object plane 14.

First, assuming K is constant, then:
$$\theta = K(Y_1+Y_2) \quad (1)$$

Second, it can be seen from trigonometry, that:
$$Y_1/d = \tan \theta \quad (2)$$

Third, substituting equation (1) and equation (2), it follows that:
$$Y_2 = 1/K \tan^{-1}(Y_1/d) - Y_1 \quad (3)$$

Obviously,
$$O = (X_2^2+Y_2^2)^{1/2} = \sqrt{(1/K \tan^{-1}(Y_1/d)-Y_1)^2 + (X_2)^2} \quad (4)$$

From the lensmaker's equation for thin lenses:
$$1/f = (n_1-n_2)(1/r' - 1/r'') \quad (5)$$

where: $n_1$ is the index of refraction of the lens material, $n_2$ is the index of refraction of the surrounding media, and $f$ is the focal length at the particular point of lens 10 which is $Y_1$ from said optical axis of lens 10.

It is well known that:
$$F = Oi/(O+i) \quad (6)$$

where: $i$ is the image distance.

From algebraic manipulation of equation (5):

$$r'' = \frac{(f)(r')(n_1-n_2)}{f(n_1-n_2)-r'} \quad \text{Equation 7}$$

Substituting equation (6) into equation (7):

$$r'' = \frac{(Oi/(O+i))(r')(n_1-n_2)}{(Oi/(O+i))(n_1-n_2)-r'} \quad \text{Equation 8}$$

Substituting equation (4) into equation (8):

Eq. 9

$$r'' = \frac{\left(\dfrac{i\sqrt{(1/K \tan^{-1}(Y_1/d)-Y_1)^2+(X_2)^2}}{i+\sqrt{(1/K \tan^{-1}(Y_1/d)-Y_1)^2+(X_2)^2}}\right)(r')(n_1-n_2)}{\left(\dfrac{i\sqrt{1/K \tan^{-1}(Y_1/d)-Y_1)^2+(X_2)^2}}{i+1\sqrt{(1/K \tan^{-1}(Y_1/d)-Y_1)^2+(X_2)^2}}\right)(n_1-n_2)-r'}$$

If the value of $i$ is taken as infinity equation (9) becomes:

$$r'' = \frac{(r')(n_1-n_2)\sqrt{(1/K \tan^{-1}(Y_1/d)-Y_1)^2+(X_2)^2}}{(n_1-n_2)\sqrt{(1/K \tan^{-1}(Y_1/d)-Y_1)^2+(X_2)^2}-r'}$$

Eq. 10 because:
$$O=f$$

and equation (4) can be substituted directly into equation (7).

Taking $i$ as infinity, K AS 34.9°/inch, and $Y_1$ as 0, 0.1, 0.2, 0.3, 0.4, and 0.5 (inches) and the other values as defined hereinabove, table 1 was prepared as follows: (using equation (9))

TABLE 1

| $Y_1$ (inch) | $r''$ (inch) |
|---|---|

Figure 5:
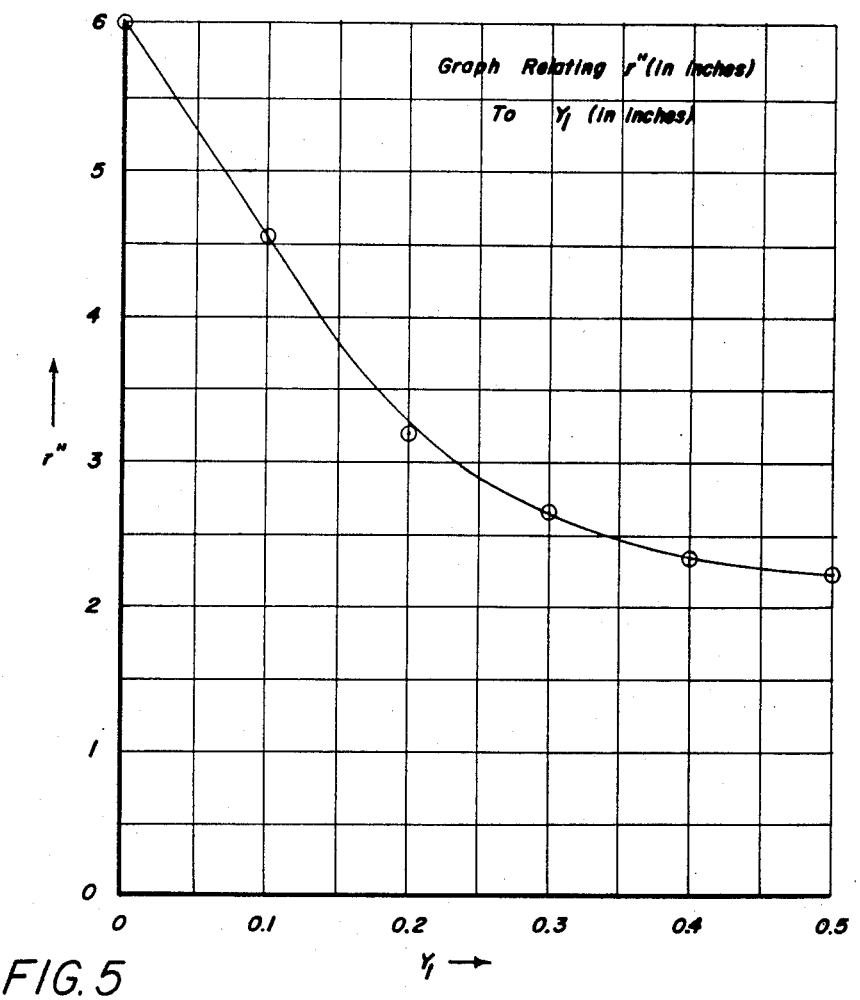
FIG. 5 is a graph relating $r''$ (in inches) to $Y_1$ (in inches) where $r''$ is the varying radius of the aspherical surface at a particular point on the aspherical surface and $Y_1$ is the perpendicular distance said particular point is from the optical axis of the lens.

| 0.0 | 6.0 |
| --- | --- |
| 0.1 | 4.56 |
| 0.2 | 3.18 |
| 0.3 | 2.67 |
| 0.4 | 2.33 |
| 0.5 | 2.21 | and the solid line of the graph of FIG. 5 was prepared.

A sample calculation with $Y_1=0.5$ inch is as follows:

$$r'' = \frac{(0.677)(0.5)\sqrt{((1/34.9)\tan^{-1}(0.5/0.288)-0.5)^2+2.32}}{(0.5)\sqrt{(1/34.9\tan^{-1}(0.5/0.288)-0.5)^2+2.325}-0.677}$$

$$r'' = \frac{(0.677)(0.5)\sqrt{(1.22)^2+2.325}}{(0.5)\sqrt{(1.22)^2+2.325}-0.677}$$

$$r'' = \frac{(0.677)(0.5)(1.952)}{(0.5)(1.952)-0.677}$$

$$= \frac{0.661}{0.299}$$

$$r'' = 2.21 \text{ inch}$$

From the following:

Halliday & Resnick, "Reflection and Refraction," Physics for Students of Science and Engineering, Part II, Second edition Library of Congress Catalog No. 62-15336, p. 940, prob. 8.

It is well known that the deviation angle $D$, is independent of the angle of incidence and is equal to $(n_1-n_2)\phi$: therefore, $$D=(n_1-n_2)\phi \quad (11)$$

Figure 4:
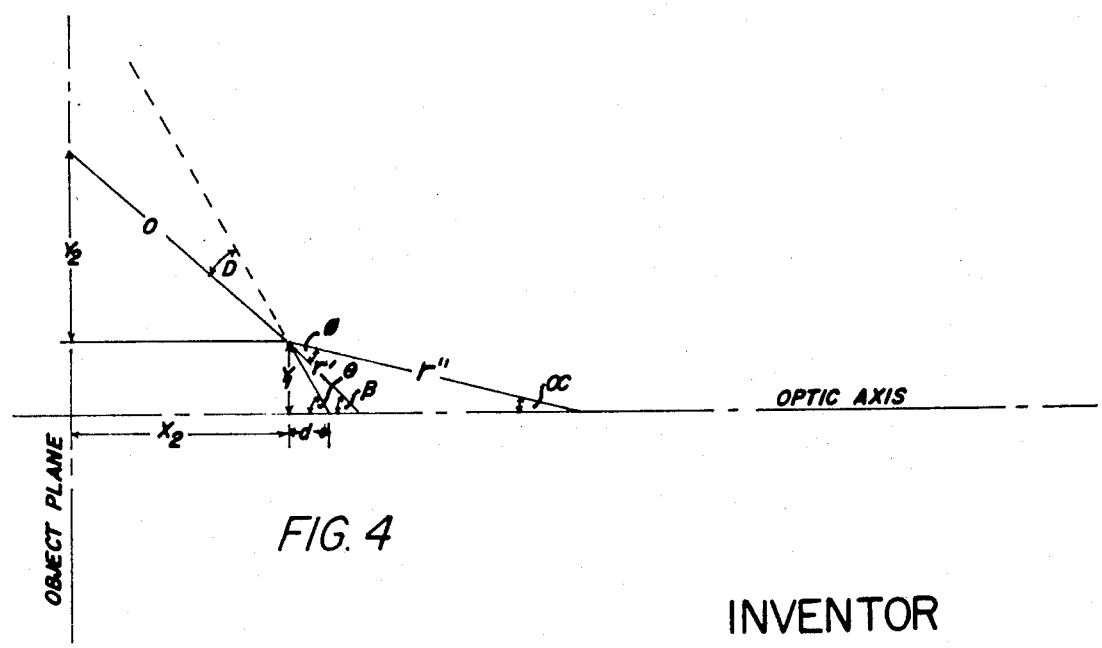

From observing FIG. 4 and the application of trigonometry:

$$\phi=B-\alpha \quad (12)$$

Also from observing FIG. 4 and the application of trigonometry:

$$Y_2=X_2 \tan(\theta-D) \quad (13)$$
$$\alpha = \sin^{-1}(Y_1/r'') \quad (14)$$
$$B = \sin^{-1}(Y_1/r') \quad (15)$$
$$\theta = \tan^{-1}(Y_1/d) \quad (16)$$

Using the values from table 1, equations (11-16), and graphically measured values of $d$ and $X_2$ table 2 was prepared as follows:

TABLE 2

| r' | $Y_1$ | $\theta$ | d | B | $\alpha$ | $\phi$ | D | $\theta-D$ | $Y_2$ | $Y_1+Y_2$ | $X_2$ |
| --- | --- | --- | --- | --- | --- | --- | --- | --- | --- | --- | --- |
| 6.00 | 0.0 | 0.0 | .294 | 0.0 | 0.0 | 0.0 | 0.0 | 0.0 | 0.0 | 0.0 | 1.465 |
| 4.58 | 0.1 | 18.85 | .2935 | 8.5 | 1.25 | 6.25 | 3.125 | 15.725 | 0.414 | 0.514 | 1.470 |
| 3.18 | 0.2 | 34.18 | .2930 | 17.18 | 3.61 | 13.47 | 6.735 | 27.445 | 0.766 | 0.966 | 1.475 |
| 2.67 | 0.3 | 45.78 | .2915 | 26.33 | 6.45 | 19.88 | 9.940 | 35.840 | 1.075 | 1.375 | 1.490 |
| 2.33 | 0.4 | 54.15 | .2895 | 36.35 | 9.90 | 26.45 | 13.225 | 40.925 | 1.307 | 1.707 | 1.510 |
| 2.21 | 0.5 | 60.00 | .288 | 47.60 | 13.08 | 34.52 | 17.26 | 42.740 | 1.408 | 1.908 | 1.525 |

It is noted that $d$ can change to any other value $d'$ simply by rotating eye 13 in its socket as shown in FIG. 3 or by moving it along the optical axis of lens 10.

Table 3 was prepared using $d'=d+0.25$ inch, and the same values of $r''$, $Y_1$, $B$, $\alpha$, $\phi$, $D$, and $X_2$ as in table 2 plus equations (13) and (16) as follows:

TABLE 3

| r'' | $Y_1$ | $\theta'$ | d' | B | $\alpha$ | $\phi$ | D | $\theta'-D$ | $Y_2$ | $Y_2+Y_1$ | $X_2$ |
| --- | --- | --- | --- | --- | --- | --- | --- | --- | --- | --- | --- |
| 6.00 | 0.0 | 0.0 | 0.5440 | 0.0 | 0.0 | 0.0 | 0.0 | 0.0 | 0.0 | 0.0 | 1.465 |
| 4.58 | 0.1 | 10.85 | 0.5435 | 8.5 | 1.25 | 6.25 | 3.125 | 7.725 | 0.1995 | 0.299 | 1.470 |
| 3.18 | 0.2 | 20.50 | 0.5430 | 17.18 | 3.61 | 13.47 | 6.735 | 13.765 | 0.351 | 0.551 | 1.475 |
| 2.67 | 0.3 | 29.00 | 0.5415 | 26.33 | 6.45 | 19.88 | 9.940 | 19.060 | 0.515 | 0.815 | 1.490 |
| 2.33 | 0.4 | 36.61 | 0.5395 | 36.35 | 9.90 | 26.45 | 13.225 | 23.285 | 0.650 | 1.050 | 1.510 |
| 2.21 | 0.5 | 42.95 | 0.5380 | 47.60 | 13.08 | 34.08 | 17.260 | 25.690 | 0.733 | 1.233 | 1.525 |

From tables 2 and 3, the dashed line of the graph of FIG. 6 can be plotted as shown with the circled points from table 2 and the crossmark points from table 3. It can be seen that the points from both tables 2 and 3 fall upon the same curve, with little error; therefore, the distance $d$ may vary considerably to another distance $d'$. The dashed curve is labeled $\theta=K(Y_1+Y_2)$, but it can be seen that it deviates only slightly (an average of some 2.4 percent) from the straight line curve labeled $\theta=33(Y_1=_2)$. Therefore, the assumption that $K$ remains substantially constant is correct, so:

$$K \cong \text{constant} \cong \theta/(Y_1+Y_2)$$

In the curve of the dashed line, $K$ can be considered equal to $\theta/(Y_1 \cong Y_2)$ and substantially constant, but in the straight line curve of the solid line, $K$ can be considered precisely constant and substantially equal to $\theta/(Y_1+Y_2)$.

With the aid of a computer and by taking the values from the dashed curve (labeled $\theta=K(Y_1+Y_2)$), the values for $r''$ can be recalculated more precisely, then the dashed curve can be recalculated more precisely until any desired precision is achieved, but for the most contemplated purpose of applicant as set forth hereinabove the answers set forth hereinabove will suffice.

It is noted that the "Hill fisheye lens" was used to reconstruct the scene in a distortionless manner by projecting the image from the flat film, upon which it was recorded, to a hemispherical screen.

In order for this to be possible, the following had to be true.

$$\theta''=K''(Y)$$

where: $\theta''$ is the angle the entrance ray, in the taking situation (or the exit ray in the projecting situation), makes with the optical axis of the fisheye lens; $Y$ is the distance along the film plane the said ray is from the optical axis of the fisheye lens; and $K'$ must be substantially the same in the recording and reconstruction process.

In most fisheye lenses, i.e. "Nikon fisheye" and "Kenko fisheye conversion" as specific examples, $K'$ is substantially constant. For example, in the "Nikon fisheye lens," $K' \cong$ 191°/inch. It can be seen that the "Nikon fisheye" picture should be enlarged (191/33=5.8) 5.8 diameters to yield substantially distortionless viewing as viewed by the ocular of the present invention specifically set forth hereinabove. In the "Kenko fisheye conversion," $K'$ can be rectilinearly varied at will, although $K'$ is substantially constant. If the lens is used to convert a 332 mm. telephoto lens to a fisheye lens, the recorded image could be directly used with the lens of the present invention specifically described above, because $K'$ would then equal substantially 33°/inch, if the Kenko published formula is true, that: focal length (in mm.) × 0.418 = $Y$ (for 180° in. mm.). As a check:

332×0.418=138.6 mm. = 5.45 inch

180°15.45 inch = 33°/inch

In actual practice the "Kenko" could be used with a 150 mm. telephoto lens with the picture enlarged two diameters used in a stereoscope having the oculars of the present invention, and the observer would not notice barrel or pincushion distortion in the recreated scene, of a viewer such as set forth in Ser. No. 560,531, filed June 27, 1966.

Figure 1:
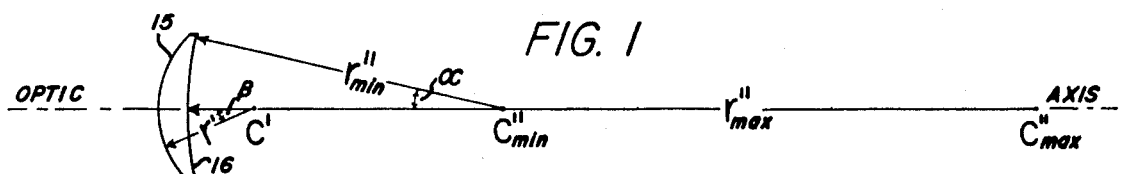
FIGS. 1-4 are diagrammatic drawings illustrating various characteristics of the lens of the present invention.

It can be seen that lens 10 can take three other forms besides the one of FIGS. 1-3. First, the lens can take the form of the aspheric surface 16 being concave as shown in FIGS. 1-3. Second, the lens can take the form of the aspheric surface 16 being convex as shown in FIG. 7. Second (a), the lens 10 can take the form of the aspheric surface 16 being convex and the spherical, nonaspheric surface 15 being convex as shown in FIG. 7(a). Second (b), the lens 10 can take the form of the aspheric surface 16 being convex and the nonaspheric surface 15 being flat as shown in FIG. 7(b). And second (c), the lens 10 can take the form of the aspheric surface 16 being convex and the spherical, nonaspheric surface 15 being concave as shown in FIG. 7(c). In applying general equation (9) (or a reduced form thereof such as equation (10)) to the aspheric surface of lens 10 in one of the forms of FIG. 7(a), FIG. 7(b), or FIG. 7(c), one of the well-known sign conventions for lens calculations must, of course, be adhered to. Only one specific example being set forth hereinabove, however. This being the form of FIGS. 1–3.

Since the assumption of equation (11) is well known to hold true only when $\phi$ is not too large, let us check at $Y_1=0.5$ inch by way of Snell's law:

$$n_1 \sin \theta_1 = n_2 \sin \theta_2 \quad (17)$$

where: $\theta_1$ is the angle of incidence (or in the light media) and $\theta_2$ is the angle of refraction (or in the heavy media) with $n_1$ and $n_2$ as above.
but at surface 16:

$$\theta_1 = \theta - \alpha$$
$$\theta_1 = 60.00° - 13.08°$$
$$\theta_1 = 46.92°$$

substituting:
$$\sin(46.92°)/1.5 = \sin \theta_2$$
$$\theta_2 = 29.15°$$

but:
$$D_1 = \theta_1 - \theta_2$$

so,
$$D_1 = 46.92° - 29.15°$$
$$D_1 = 17.77°$$

Going back into equation (17) for surface 15:
$$\theta_2' = B - (\theta_2 + \alpha)$$
$$= 47.60 - (13.08 + 29.15)$$
$$\theta_2' = 5.37°$$
$$\sin \theta_1' = 1.5 \sin(5.37°)$$
$$= (1.5)(0.0936)$$
$$\theta_1' = 8.08°$$
$$D_2 = 8.08° - 5.37°$$

but:
$$D = D_1 + D_2$$

so,
$$D = 17.77° + 2.61°$$
$$D = 20.38°$$

therefore:
$$\theta - D = 60° - 20.38°$$
$$\theta - D = 39.62°$$

back to equation (13):
$$Y_2 = X_2 \tan(\theta - D)$$
$$Y_2 = (1.525) \tan(39.62°)$$
$$Y_2 = 1.262 \text{ inch}$$

finally:
$$Y_1 + Y_2 = 1.762 \text{ inch}$$

This point is within the square or the graph of FIG. 6. It can be seen that it is almost precisely in line with the outer points below the 40° line.

This indicates that the assumption that $K$ is constant is almost precisely correct and $K$ is practically an absolute constant value of 34°/inch in this specific situation of FIGS. 1–3, and that this assumption could be used when $\theta$ is considerably more than 60°, i.e., 90°.

In practice, application has found $K$, at least, very substantially constant for many types of lenses, i.e., plane convex, double convex and moniscus, over a wide angle. Of course, an angle of 60° from the optical axis represents an angle of view of 120° as does 90° represent 180° angle of view.

While the invention has been disclosed and described in some detail in the drawings and foregoing description, they are to be considered as illustrative and not restrictive in character, as other modifications may readily suggest themselves to persons skilled in the art and within the broad scope of the invention, reference being had to the appended claims.

I claim:

1. In a wide-angle lens means of refractive material with an index of refraction substantially greater than the surrounding media, a first optical surface having a radius of curvature $r$ and a second optical surface having a radius of curvature:

$$\frac{\left(\dfrac{i\sqrt{(1/K \tan^{-1}(Y_1/d) - Y_1)^2 + (X_2)^2}}{i + \sqrt{(1/K \tan^{-1}(Y_1/d) - Y_1)^2 + (X_2)^2}}\right)(r)(n_1 - n_2)}{\left(\dfrac{i\sqrt{(1/K \tan^{-1}(Y_1/d) - Y_1)^2 + (X_2)^2}}{i + \sqrt{(1/K \tan^{-1}(Y_1/d) - Y_1)^2 + (X_2)^2}}\right)(n_1 - n_2) - r}$$

where each said radius of curvature has its respective origin on the optical axis of the lens means and respectively form each said optical surface as one continuous surface,
where $n_1$ is the refractive index of the lens material and $n_2$ is the refractive index of the surrounding media,
where $Y_1$ is the distance perpendicular from said optical axis to a point upon said second optical surface through which a ray passes from a point upon the object plane through the pupil of an observer's eye to a point upon the retina of said eye,
where $d$ is the distance along said optical axis from said pupil to the plane of said point upon said second surface,
where $i$ is the distance from said pupil to the virtual image surface point at which the virtual image of said point upon the object plane is formed and is greater than the distance of distinct vision for the eye,
where $X_2$ is the distance along said optical axis from the plane of said object plane point perpendicular to said optical axis to the plane of said point upon the second surface perpendicular to said optical axis, and
where $K$ $\theta/(Y_1+Y_2)$ with $\theta$ being the angle between said ray and said optical axis at said pupil and $(Y_1+Y_2)$ being the distance upon said object plane from said optical axis to said point upon the object plane.

2. The lens of claim 1 wherein: $K$ is precisely constant and substantially equal to $\theta/(Y_2+Y_1)$.

3. The lens of claim 1 wherein: $K$ is precisely equal to $\theta/(Y_2+Y_1)$ and substantially constant.

4. The lens of claim 1 wherein said second surface is concave.

5. The lens of claim 1 wherein said second surface is convex.

6. The lens of claim 5 wherein said first surface is flat.

7. The lens of claim 5 wherein said first surface is concave.

8. The lens of claim 5 wherein said first surface is convex.

* * * * *